Feb. 21, 1961 D. C. ROSS 2,972,742
AUTOMATIC POSITION-REPORTING SYSTEM
Filed Sept. 12, 1956 7 Sheets-Sheet 1

INVENTOR.
DAN C. ROSS
BY
ATTORNEY

Feb. 21, 1961   D. C. ROSS   2,972,742
AUTOMATIC POSITION-REPORTING SYSTEM
Filed Sept. 12, 1956   7 Sheets-Sheet 2

Feb. 21, 1961    D. C. ROSS    2,972,742
AUTOMATIC POSITION-REPORTING SYSTEM
Filed Sept. 12, 1956

United States Patent Office
2,972,742
Patented Feb. 21, 1961

2,972,742

AUTOMATIC POSITION-REPORTING SYSTEM

Dan C. Ross, Wappingers Falls, N.Y., assignor to International Business Machines Corporation, New York, N.Y., a corporation of New York Filed Sept. 12, 1956, Ser. No. 609,414

29 Claims. (Cl. 343—112)

The present invention relates to systems for determining the transient position of mobile conveyances, such systems frequently being referred to as position indicating systems. While the invention has general application to position determination for many forms of conveyances, such as airplanes and ocean-going vessels, it has particular utility in the determination of the transient position of aircraft in flight and will be described in that connection.

In present day air traffic control, perhaps the most important single factor involved in the procedural reliability and success or failure of operation is that of consistent and reliable position reporting. This function is the sole responsibility of the aircraft pilot, and the attainment of adequate control must therefore center around numerous and diverse personalities. In addition, a very large fraction of the equipment and manpower required in the present air traffic control system is tied up in this position reporting activity. An aircraft pilot must divert a great deal of his attention from the actual control of his airplane to such operations as talking or listening to ground controllers, for the purpose of reporting position or for the purpose of acknowledgments or other procedural communications, and to such operations as adjusting the tuning controls of communication equipment or in consulting maps and charts for information needed in the position reporting function. It may be noted that many of the readings which the pilot takes from his navigational instruments are needed only to enable the pilot properly to accomplish his position reporting function and not because the pilot wishes such frequent position information for his own information in accomplishing his primary function in piloting the aircraft. In addition to the disadvantages that the present air traffic control system involves the human element factor both in position reporting by each pilot and the translation of position reports into control procedures by ground control personnel, there is the further important disadvantage of this system that a substantial amount of radio spectrum is required for communications at the present time in accomplishing system control and the spectrum requirements for these purposes can reasonably be expected to increase as the present system is expanded in scope and function.

It has been proposed that the present air traffic control system be supplemented, with a view to increasing its effectiveness in handling increased air traffic, by the use of long range radar installations spaced along established air lanes. Since radar installations for economic considerations ordinarily operate largely in the ultra-high-frequency region of the radio spectrum, their reliability of operation is often seriously impaired by weather conditions involving dense cloud formations, fog and rain. They have the further disadvantage that the precision of position determination at maximum operating range is not as high as desirable, and they are characterized by an excessive noise to signal ratio which in practice substantially reduces their theoretical effective range. While use of radar installations does minimize the equipment required to be carried in the aircraft, this is more than offset by the necessity of utilizing the full attention of one or more operating personnel at each radar installation or by a very substantial amount of computing capacity to accomplish automatic position determinations.

It is an object of the present invention to provide a new and improved automatic position-reporting system which provides essentially continuous position determinations rapidly and automatically without the need of human oversight or control.

It is a further object of the invention to provide an automatic position-reporting system which is particularly adaptable to rapid, precise, and highly reliable position determinations by the use of easily programmed high-speed automatic computing equipment.

It is an additional object of the invention to provide a novel automatic position-reporting system which may readily supplement or supplant one or more forms of traffic control systems currently used or proposed for use.

It is yet a further object of the invention to provide an automatic position-reporting system particularly suited for air traffic control and, when so used, one capable of providing maximum air safety and maximum traffic density under complete air control blanketing the entire country or entire regions thereof while yet reducing to a minimum the nature and complexity of system equipment and the number of supervisory and maintenance personnel required.

Other objects and advantages of the invention will appear as the detailed description proceeds in the light of the drawings forming a part of this application and in which:

Fig. 1 represents an automatic position-reporting system in accordance with a form of the present invention suitable for use in a traffic control system utilizing a number of contiguous position-reporting areas comprising a much larger traffic control region;

Fig. 2 graphically represents the positional relationship of the fixed ground stations used in each position-reporting area, on a system of Cartesian coordinates (conveniently having their origin at one of the stations) and is used as an aid in explaining the manner in which position determination may be automatically computed and visually displayed;

Figures 1, 6, 6A:
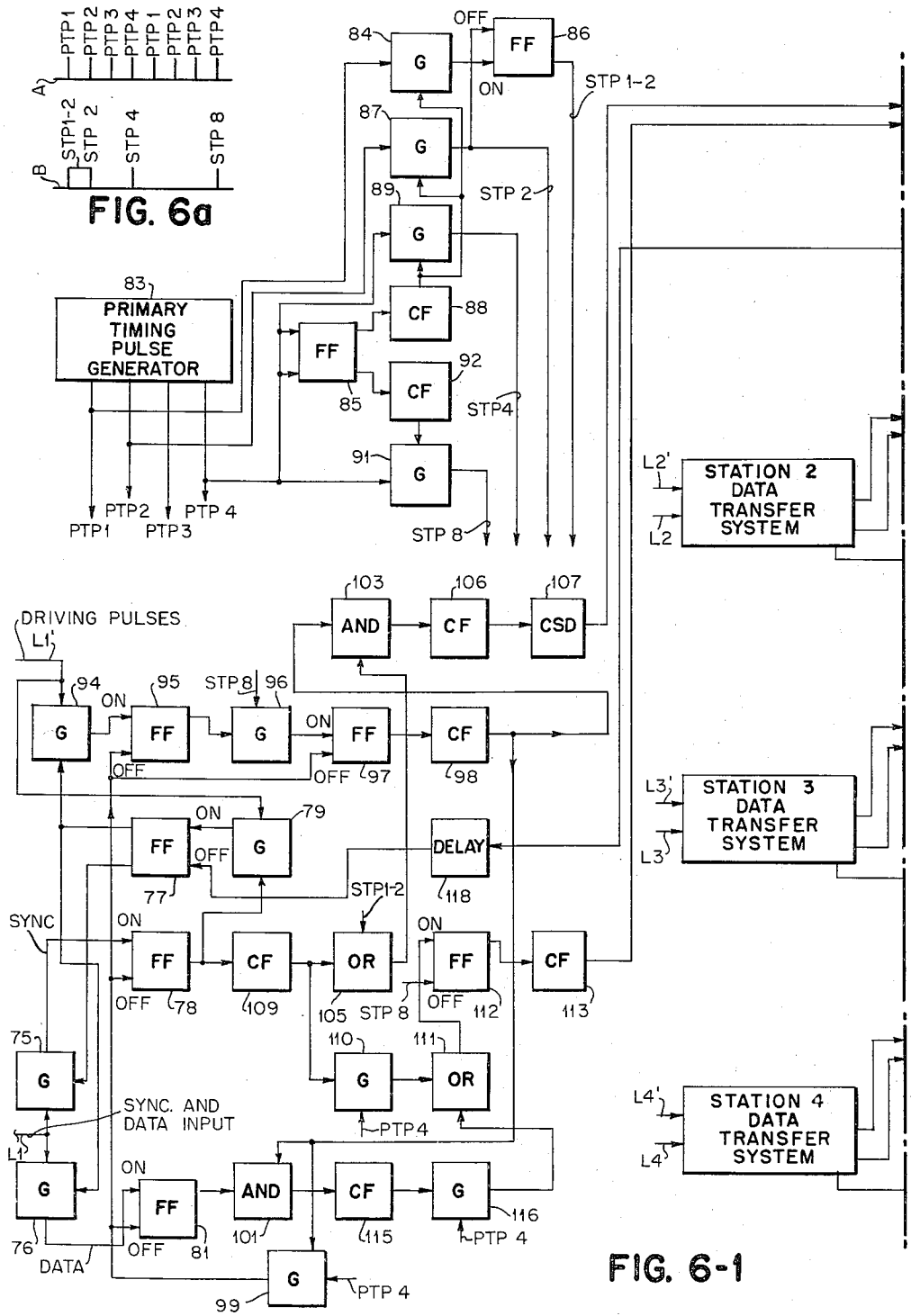
Figures 2, 6:
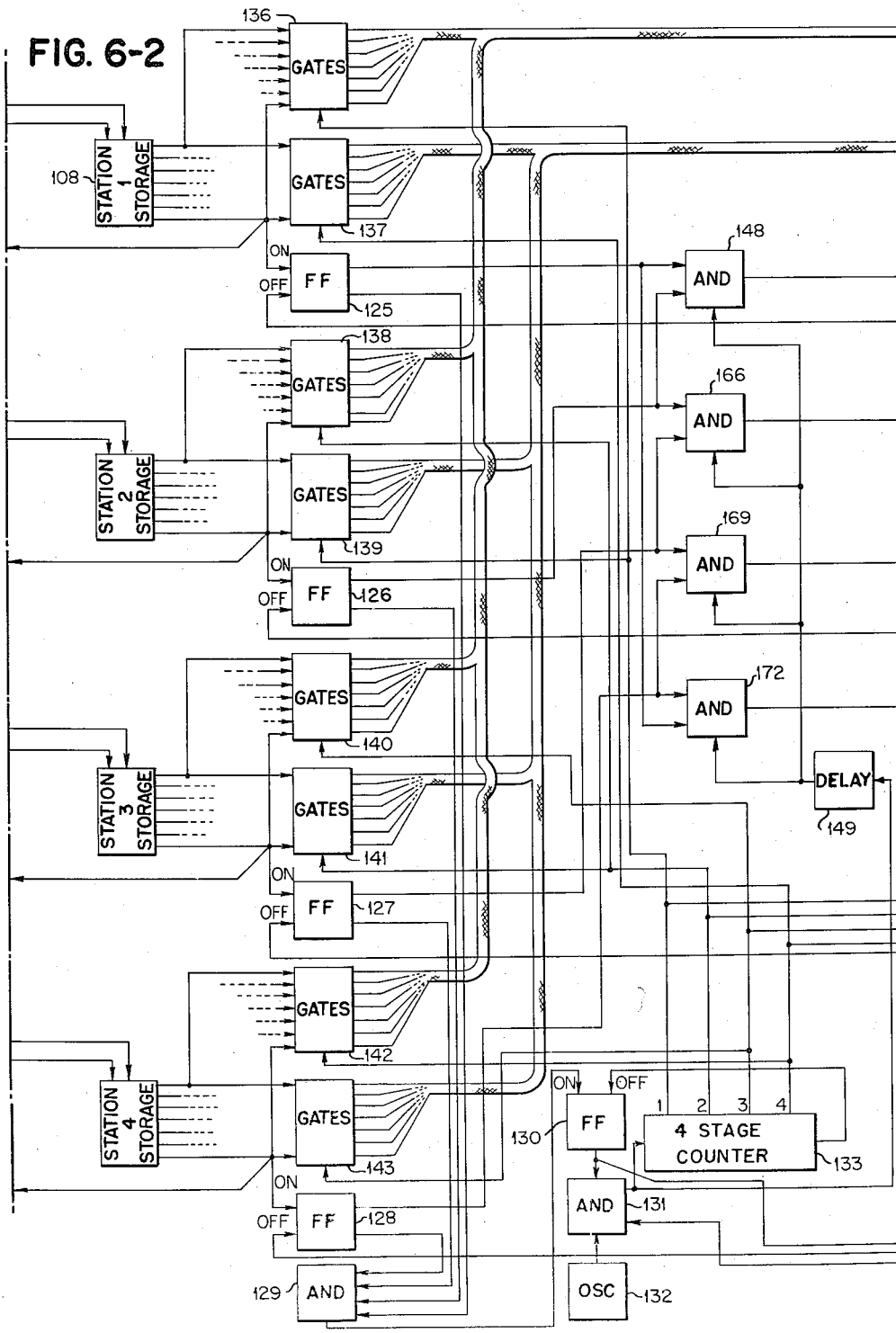
Figures 3, 6:
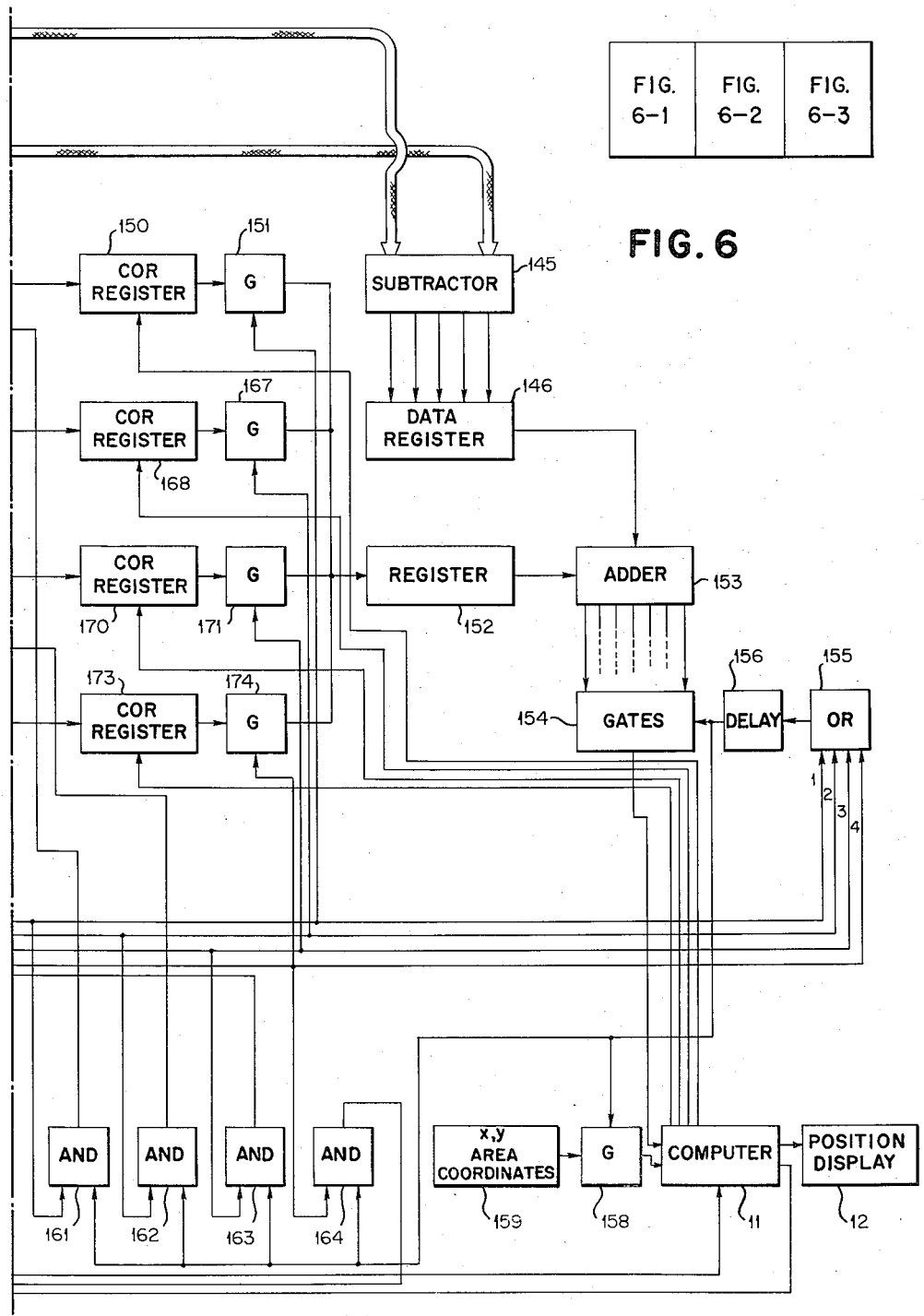

Fig. 6 shows a composite arrangement of Figs. 6–1, 6–2 and 6–3 which together represent the arrangement of equipment utilized at a region control center to which all automatic position-reporting data from all areas of the region is supplied for automatic computation and utilization such as to provide a display of the automatically reported positions of all mobile craft occupying the region; and Fig. 6a graphically represents certain timing signals which are used in controlling the operation of a portion of the Fig. 6 system.

General organization and operation

Figure 1:
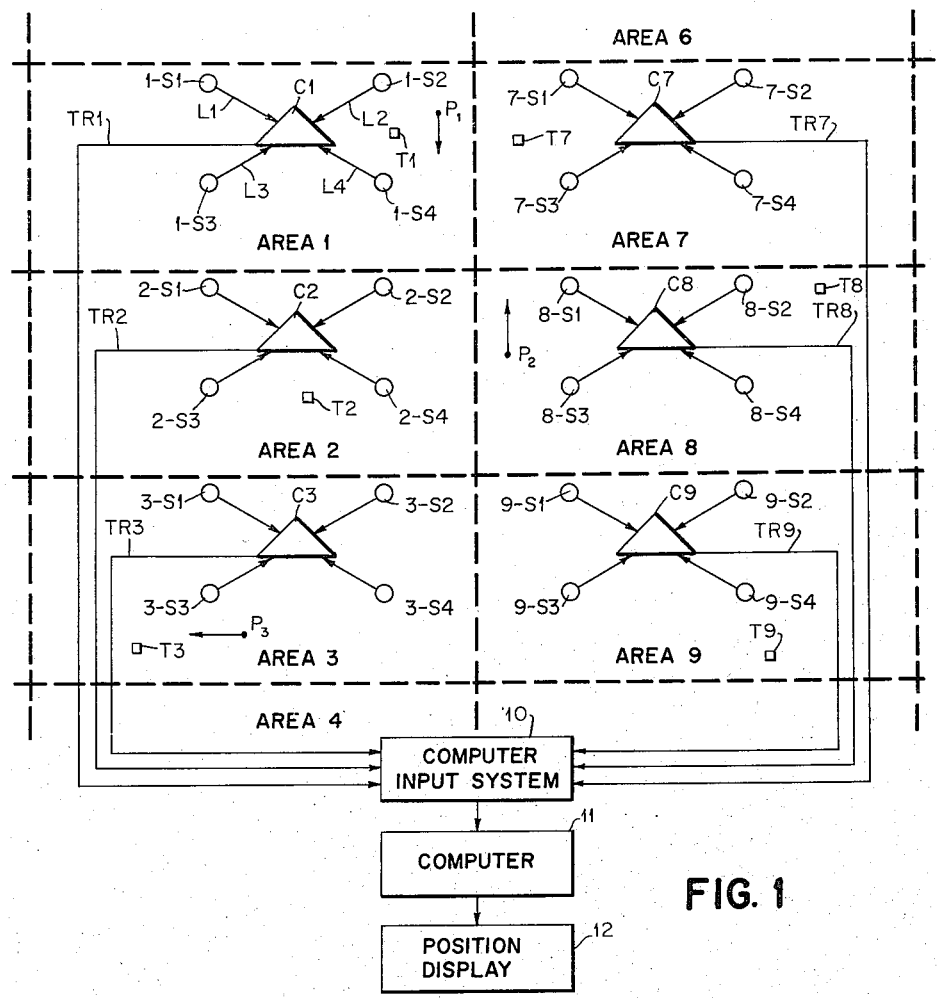

Automatic position reporting by the system herein disclosed may be accomplished either in an individual area which may have a size of several square miles of a much larger size of several hundred square miles, or may be accomplished with equal facility over a much larger region of several thousand square miles in size conveniently divided into a number of contiguous reporting areas of any selected convenient size or sizes. A system of the latter type is shown in Fig. 1 of the drawings wherein a number of contiguous designated areas of a much larger region are indicated as having boundaries identified by broken lines. While these areas are shown for convenience as similar in size and of rectangular configuration, both their size and configuration may differ from area to area without affecting the system function. Each of these areas includes a plurality of ground stations, shown as four in number and identified for the area 1 as stations 1–S1, 1–S2, 1–S3, and 1–S4. These several stations receive periodically recurrent position-reporting pulses of electromagnetic radiation from equipment carried by any mobile craft within the area, such as from an airplane P1 in area 1, an airplane P2 in area 8, and an airplane P3 in area 3. These recurrent pulses are automatically radiated by the mobile craft without operator attention and their transmission occurs continuously throughout the position reporting operation, which for an airplane generally would extend from take off to landing.

The reporting system considered on a regional basis has repetitive cycles of operation which, for example, may have a cyclic period of ten or eleven seconds duration. Each such system cycle is divided into a large number of equal periods of time, referred to hereinafter as time "slots," each of which may conveniently have one millisecond duration. An initial number of these time slots in each system cycle are allocated to area station clock calibration purposes described hereinafter, and the remaining time slots of the cycle are allocated to the position reporting function. For position reporting, each mobile craft is assigned an individual time slot during which it radiates its periodic position-reporting electromagnetic pulse, and these assigned time slots are sufficiently separated by non-assigned slots that all positional computations for the position-reporting pulse of one mobile craft are completed by the system prior to the occurrence of the succeeding position-reporting pulse of another mobile craft. In this manner all mobile craft within a region automatically and successively report their positions once during each system cycle. Repetitive such reports during successive system cycles enable the movement of each mobile craft to be followed and thereby enable a determination of its course, direction, and velocity.

Each such position-reporting pulse radiated from a point within an area is received by all of the ground stations in that area, and the time of arrival of the pulse at each station is automatically registered by the station. This time-of-arrival information is thereupon automatically transmitted through individual telephone circuits or other convenient communication channels, passing conveniently through an area control center (such as the four-channel trunk TR1 extending through control center C1 for the area 1), to a computer input system 10. The input system 10 receives the time-of-arrival information from each of the several stations in an area, may correct it for slight differences between the momentary clock time readings prevailing at the area stations as will presently be explained in more detail, and supplies this information (together with information relating to the coordinate position of the particular reporting area within the control region) to an automatic computer 11. The latter is pre-programmed to compute from the data supplied it the position of the mobile craft, such as the airplane P1, in the control region. The results of this computation are thereupon automatically supplied by the computer 11 to a utilization equipment 12 which may, for example, comprise a position display system where the transient positions of all mobile craft in the control region are displayed in relation to each other and in such manner that their changing positions may be followed over any desired period of time. From this display the course and velocity of movement of each mobile craft may be ascertained, the precise position of each craft at any given time may be determined, and the projected course and future position of each craft at any selected time may readily be estimated. This is of inestimable value in air traffic control not only from the standpoint of avoiding collision courses for any two aircraft in flight but also in providing information from which close estimates of the numbers and times of arrival of specified aircraft at certain points may be readily and speedily ascertained. This information enables the most efficient and rapid flow of traffic to be accomplished by such appropriate flight control instructions from the regional control center to each aircraft in flight as desirable or necessary.

All of the mobile craft utilizing a control region transmit their position-reporting electromagnetic pulses on a common transmission frequency in the radio spectrum, whereby entire regional reporting requires only one operating frequency for transmissions. The automatic position-reporting pulse transmissions by each mobile craft in the control region may be at random recurrence as between the several mobile craft, but this random nature of the pulse transmissions may somewhat impair for short intervals the accuracy of position determination for several craft due to the fact the pulse transmissions of these craft may for a short time occur, so nearly simultaneously as to cause erroneous computations at the regional computer. While this condition would be of short duration, the position determinations occurring during this interval would be temporarily lost for the several mobile craft concerned. While this might be satisfactory in regions of low traffic density, it would be highly undesirable in regions of high traffic density. Any such condition is readily avoided by synchronizing the automatic position-reporting operations of each mobile craft in the control region. Such synchronization requires an additional radio transmission band, selected of relatively low carrier frequency for purposes of consistently reliable reception regardless of terrain and the general curvature of the earth's surface (for example a frequency somewhere between 100 and 200 kilocycles). Since all of the position reporting pulse transmissions occur in the same communication channel, the automatic position-reporting operations of the mobile craft within the control region may be so synchronized that the position-reporting recurrent pulses transmitted by each craft occur in interleaved fashion with those of all other mobile craft which utilize or may utilize the control region. As thus synchronized, the position-reporting transmissions of each mobile craft can never interfere with those of another so that no confusion or error may arise even though all occur on a common communication frequency. Furthermore, the synchronized mode of operation provides a means of positive identification of each mobile craft.

Since the automatic position-reporting pulses transmitted to the ground stations may be received by stations ouside of the area within which the reporting craft may be located at a given time, no confusion will arise from this fact since the position information will be received and processed by the computer more quickly for the ground stations of the area in which the reporting craft is located. The regional computer can be readily programmed to ignore later received positional reports, or to discard the results of any such computation as show that the report emanated from outside the boundaries of the reporting area, or to discard any return received from stations far from the previously calculated position of the aircraft.

It was mentioned above that the time of arrival of each position-reporting pulse is recorded at each ground station of an area and that the time-of-arrival information is transmitted to the regional computer. The time of arrival is so identified and recorded by the use of what may be conveniently called an "electronic clock" included in the equipment at each ground station. Each of these clocks operates with high precision, and slight relative differences between the indicated times of the clocks of the several stations in an area may be avoided by synchronizing the clocks from a central point in the area. Since, however, the stations of an area will ordinarily be spaced by a distance of anywhere from 75 miles to 150 miles apart, and since clock synchronization from a central point in the area would require additional communication facilities to each station from the synchronizing point, high accuracy in the use of time-of-arrival recorded received position information may be accomplished without such clock synchronization. This is effected by making appropriate corrections to the indicated times of arrival of position information at the several stations. To this end, each area preferably includes a calibration transmitter, such as the transmitter T1 for the area 1. This transmitter utilizes the same equipment as each mobile craft in the control region and also radiates recurrent position-reporting electromagnetic pulses just as though the calibrating transmitter were a mobile craft itself. The calibrating transmitter has a precisely known fixed position within its area. The position pulse transmissions received from an area calibrating transmitter by the ground stations of that area treat the transmissions as though emanating from a moving craft and transmit the relative time-of-arrival identification information to the regional computer. These position reports of the calibrating transmitters occur in the calibration portion of each system operating cycle as earlier mentioned, and further occur successively as between successive areas in the control region. This calibration transmission time-of-arrival information for each region is received by the regional computer 11, and the computer is so programmed during the interval of calibration transmissions that it performs positional computations in inverse manner using the precisely known position of each calibrating transmitter in a given area. The results of this inverse computation then provide a relative clock-difference correction factor for each pair of stations of an area. This correction factor is stored by the regional computer input system 10 and is utilized to modify the time-of-arrival information of corresponding pairs of stations so that the modified information is identical to that which would be supplied by the stations if their clocks were operating in exact synchronism.

*Position computations*

The time-of-arrival information resulting from position-reporting pulses received at the stations in an area may be utilized to compute the position of a mobile craft relative to the ground stations. This may be accomplished by any of a number of different types of computation procedures.

Figure 2:
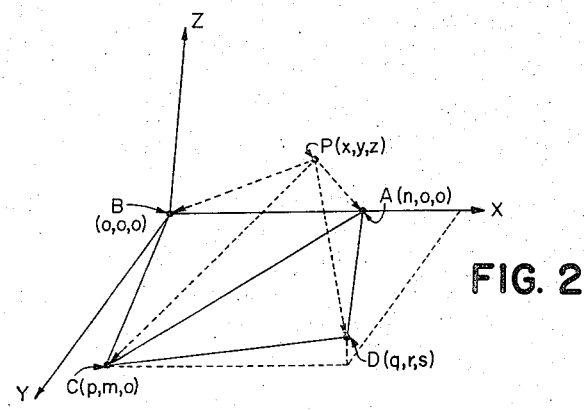

A representative method of computation, which gives the craft position in terms of Cartesian coordinates having an origin at one of the ground stations, will now be briefly considered by reference to Fig. 2. The latter identifies the locations of the four stations of a representative area as A, B, C and D, and indicates by way of illustration that the origin of the system of Cartesian coordinates lies at station B. A position reporting pulse radiated by an airplane P is received at the ground stations at individual values of time of arrival, and the difference of these times of arrival at any pair of stations defines the position of the airplane as being located somewhere along a hyperbola symmetrical about an axis passing through the pair of stations. The point of intersection of two or more such hyperbola corresponding to two or more pairs of the ground stations discretely identifies the position of the airplane.

Thus, if the time of arrival of a position-reporting pulse at any station is represented by T with a subscript identifying the particular station in question, the difference values K1, K2, and K3 of the times of arrival for three pairs of stations may be represented by the following equations:

$$T_A - T_B = K1 \quad (1)$$
$$T_C - T_B = K2 \quad (2)$$
$$T_D - T_B = K3 \quad (3)$$

If the velocity of propogation is represented by the constant V, and if the reference time has zero value at each of the stations at the moment the reporting pulse leaves the airplane, the time required for a position pulse from the airplane P to travel to each of the ground stations may be expressed by the following equations:

$$(VT_B)^2 = X^2 + Y^2 + Z^2 \quad (4)$$
$$(VT_A)^2 = (N-X)^2 + Y^2 + Z^2 \quad (5)$$
$$(VT_C)^2 = (P-X)^2 + (M-Y)^2 + Z^2 \quad (6)$$
$$(VT_D)^2 = (Q-X)^2 + (R-Y)^2 + (S-Z)^2 \quad (7)$$

Combining Equation 4 with Equations 5, 6 and 7 results in the following equations:

$$V^2(T_B^2 - T_A^2) = 2XN - N^2 \quad (8)$$
$$V^2(T_B^2 - T_C^2) = 2XP - P^2 + 2YM - M^2 \quad (9)$$
$$V^2(T_B^2 - T_D^2) = 2XQ - Q^2 + 2YR - R^2 + SZ - S^2 \quad (10)$$

Noting that the following relation holds:

$$T_A^2 = (K_1 + T_B)^2 = K_1^2 + 2K_1 T_B + T_B^2 \quad (11)$$

or $$T_B^2 - T_A^2 = -K_1^2 - 2K_1 T_B \quad (12)$$

Equations 8, 9 and 10 simplify to the following forms:

$$V^2(K_1^2 + 2K_1 T_B) = N^2 - 2XN \quad (13)$$
$$V^2(K_2^2 + 2K_2 T_B) = P^2 + M^2 - 2PX - 2MY \quad (14)$$
$$V^2(K_3^2 + 2K_3 T_B) = Q^2 + R^2 + S^2 - 2QX - 2RY - 2SZ \quad (15)$$

Solving Equations 13, 14 and 15 for the position of the airplane in terms of its X and Y coordinates leads to the following equations:

$$X = \frac{N^2 - V^2(K_1^2 + 2K_1 T_B)}{2N} \quad (16)$$

$$Y = \frac{P^2 + M^2 - 2PX - V^2(K_2^2 + 2K_2 T_B)}{2M} \quad (17)$$

It will be apparent from the latter equations that the times of arrival of a position-reporting pulse at the four ground stations of an area may be utilized in a computer programmed in accordance with Equations 16 and 17 by which to derive the X and Y coordinates of the reporting airplane position. The computed values of the X and Y position coordinates resulting from any computation may readily be transformed to corresponding voltage values in a manner hereinafter explained, and these voltage values may then be applied to a display device by which to display each reported position of the airplane relative to the ground stations. Since the area ground stations occupy a precise known location within a control region, each computation of a reporting airplane position may readily be transformed to the origin of and displayed in relation to a regional system of Cartesian coordinates, and this is done in the system hereinafter described.

The automatic reporting system is comprised of a number of component systems which in the interest of clarity of presentation will now be described in turn.

*Regional synchronization of area operations*

In order that the position reporting operations in any area may be accurately correlated in point of time with respect to that of any other area, the reporting operations within each area are accurately synchronized with relation to those of the other areas within the region. This synchronized operation also obtains as between all regions within a much larger control plan, such as the sum total of all control regions lying within the boundaries of a nation (or even those lying within the boundaries of two adjoining nations).

Figure 3:
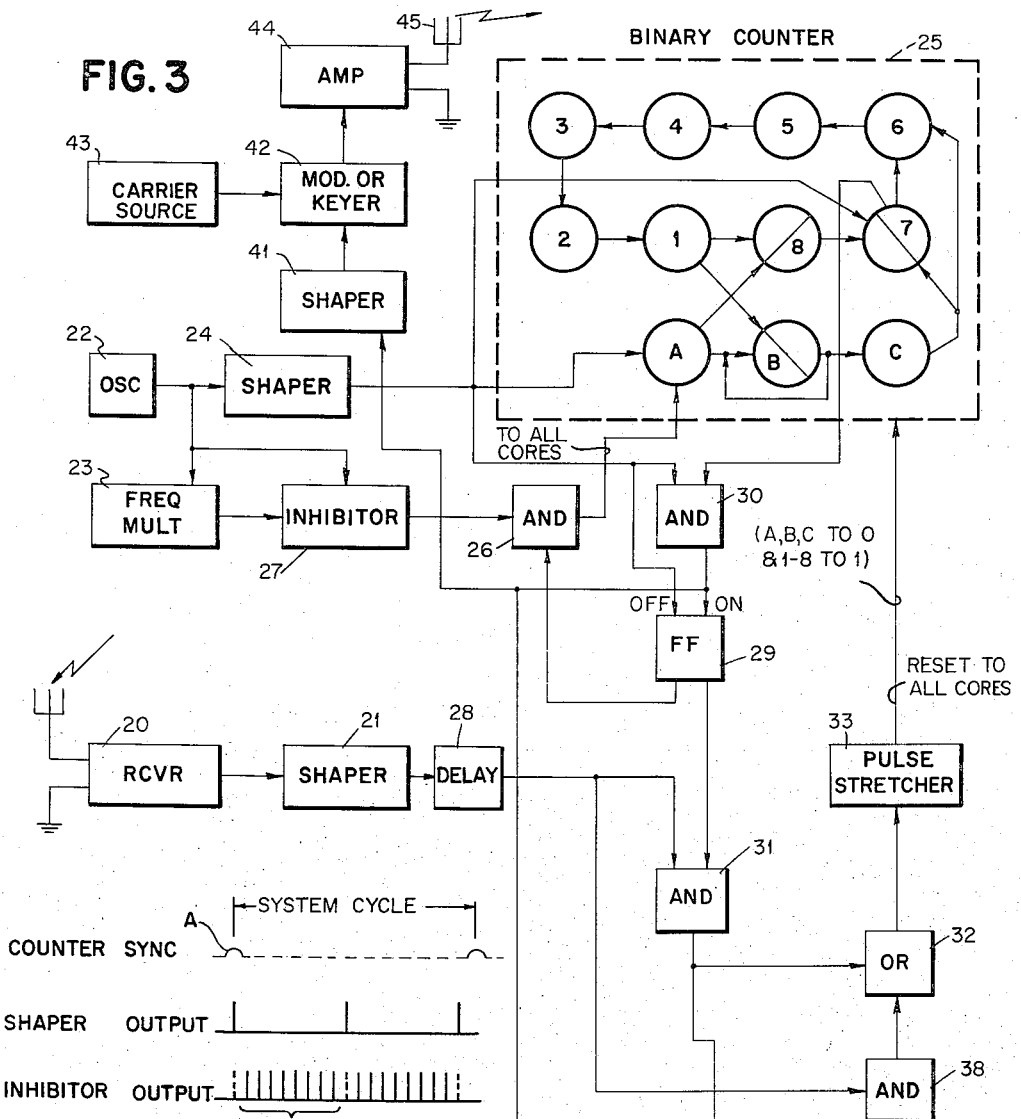
Fig. 3 represents a synchronizing system which may be utilized in each area of the automatic position-reporting system to effect a synchronous form of system operation, and Fig. 3a graphically represents certain time relationships involved in the operations of several units of the Fig. 3 system and is used as an aid in explaining its operation.
Figure 3A:
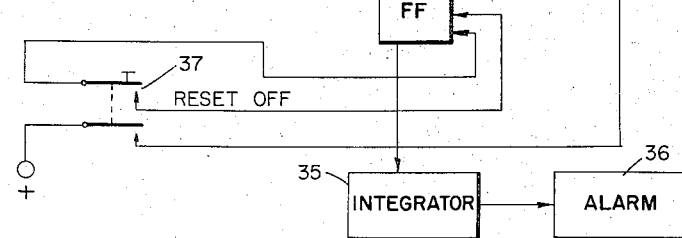

Fig. 3 represents an operational synchronizing system employed at a convenient ground location within each area. Synchronization of this system in controlled from a synchronizing transmitter common to all control regions in the larger control plan previously mentioned. This synchronizing transmitter radiates a synchronizing pulse of electromagnetic energy of ½ to 1 millisecond duration to initiate each control system cycle of operation, the radiation preferably occurring at a relatively low carrier frequency of the order of 100 to 200 kilocycles in order that the radiations may consistently be received without regard to the curvature of the earth or conditions of terrain prevailing within any control area. The synchronizing radiations are received by a receiver 20 included in the area synchronizing system. The synchronizing pulses derived by the latter, and graphically represented by curve A of Fig. 3a, are applied to a wave shaper unit 21. In the interest of conservation of band width in the transmission of a synchronizing pulse, the pulse wave form as indicated by curve A of Fig. 3a does not have sharp leading or trailing edges, and it is the function of the shaper 21 to shape each such synchronizing pulse to a wave form having a more sharply defined leading edge suitable for more precise synchronization. These reshaped pulses are then applied to a delay unit 28 which provides a value of pulse delay that such corresponding synchronizing pulse energize from the output of the delay units 28 of all synchronizing systems regardless of the distance of any particular synchronizing system from the synchronizing transmitter.

The ground synchronizing system also includes an oscillator 22 having a frequency related to the time slot periodicity within each control system cycle, the oscillator frequency having a value of 1 kilocycle for time slots of 1 millisecond duration. The output of the oscillator 22 is applied both to a frequency multiplier 23 and a wave form shaper 24 which shapes the normally sinusoidal oscillations of the oscillator 22 (a sinusoidal oscillator being selected for high frequency stability and preferably being of the piezoelectric crystal controlled type) to a wave form suitable to drive a binary counter 25. The latter includes a plurality of magnetic storage cores identified by their functional position as cores Nos. 1 through 8, all connected in ring fashion as shown so that the output of one core is applied to the input of the succeeding core. Three additional control cores identified as cores A, B and C are connected in tandem. Cores A and 7 receive the driving pulses from shaper 24, and core A supplies an output to an input of core B and also an output to an inhibition winding of core 8 which functions to inhibit any transfer of binary information from core 8 to core 7 so long as the inhibit input is energized by core A. Cores having this inhibiting construction are disclosed in the copending application Serial No. 530,522, filed August 25, 1955, now Patent No. 2,842,755, in the name of R. C. Lamy, entitled "Ternary Magnetic Storage Device" and assigned to the same assignee as the present application. The core 1 also energizes an inhibition winding of core B and the output of core C energizes both an input of core 6 and an inhibition winding of core 7 as indicated in the drawing. All cores also receive counter advance pulses supplied to the frequency multiplier 23 through an AND unit 26 and an inhibitor unit 27 operated to inhibit certain pulses supplied by the unit 23 as will presently be explained.

Considering at this point the operation of the binary counter 25, it may be stated that the counter initiates a cycle of counter operation at a time when all of the cores Nos. 1 through 8 store a binary ONE while the cores A, B and C store a binary ZERO. A positive half cycle of oscillation generated by the oscillator 22 is shaped to pulse wave form by the pulse shaper 24 and is applied to cores A and 7 to store a binary ONE in the core A but effecting no change in the storage of core 7 which already stores a binary ONE. At the same time, this positive half cycle of oscillation is applied to the frequency multiplier 23, to synchronize its operation with that of the oscillator 22, and is also applied to the inhibitor 27 which inhibits the translation by the latter of a corresponding pulse of the frequency multiplier 23 as graphically indicated in Fig. 3a by the broken-line inhibitor output pulses shown in relation to the shaper output pulses. Accordingly, the core A receives a pulse from the shaper 24 but none of the cores receive an advance pulse through the inhibitor 27 from the frequency multiplier 23.

The next advance pulse of the frequency multiplier 23 is however translated by the inhibitor 27 and by the AND unit 26 to all of the cores (the AND unit 26 being conditioned to translate the pulse by a flip-flop unit 29 which was turned Off by the preceding pulse translated by the shaper 24). This advance pulse applied to the core A changes the binary state of the latter so that it now stores a binary ZERO, and the core A in turn inhibits read-in from core 1 to core 8 but does not inhibit read-out from core 8 to core 7. Core 1 inhibits read-in from core A to core B, so the net result of the first advance pulse is to leave a zero standing in cores A, B, C and 8 and a ONE standing in the cores 1 through 7. The next advance pulse applied to all cores from the frequency multiplier 23 through the units 26 and 27 serves to transfer a binary ZERO standing in any one of the cores 1 through 8 to the next succeeding one of these cores but otherwise does not modify the storage of the binary ONE in the remaining cores so that the binary ZERO stored in core 8 is transferred to core 7. The succeeding six pulses from the frequency multiplier 23 causes this binary ZERO to transfer around to core 1.

At the next time interval, an oscillation is received from the oscillator 22 and is applied to the core A but the corresponding pulse from the frequency multiplier vibrator 23 is suppressed by the inhibitor 27 as indicated by the broken line pulse of Fig. 3a, thus again storing a binary ONE in the core A. The next pulse of the frequency multiplier 23 is applied to all cores and transfers the binary ONE from core A to core B which is not inhibited at this time by core 1 which contains a binary ZERO. At the same time, the binary ONE stored in core 8 is transferred to core 7 to leave a zero in core 8 and all binary ONE'S in numbered cores are transferred to the succeeding core of lower number. The second advance pulse transfers this zero to core 7 and the ONE in core B is transferred to core C, but the binary ONE in core 1 inhibits the read-out of core B from restoring a binary ONE in core B. On the third pulse the read-out of a binary ONE in core C inhibits read-in of a binary ONE into core 7 thus leaving a binary ZERO in core 7 and at the same time would cause read in of a binary ONE into core 6 if the latter had stored a zero at this time.

It can be shown that the drive of the binary counter 25 under control of the shaper 24 and inhibitor 27 is such that the binary number stored in the counter is reduced by one numerical unit value at the end of each counter cycle so that ultimately all of the cores 1 through 8, except core 7, store a binary ONE and only core 7 stores a binary ZERO. The next pulse applied to the counter through the shaper 24 causes the core 7 also to store a binary ONE thus completing the counter count-down operation and an output is obtained from the core 7 and is applied to an AND unit 30. This read-out occurs at the same time that a pulse from shaper 24 is also applied to the AND unit 30 so that the latter translates the output pulse of the core 7 to turn on a flip-flop 29. The On output circuit of the latter conditions an AND unit 31 to translate the synchronizing pulse received by the receiver 20 and translated by the shaper 21 and delay unit 28 if this delayed synchronizing pulse occurs within one time period of the oscillator 22, thus indicating that the counter is within essential proper system synchronism. If the AND unit 31 is properly conditioned as last mentioned, the synchronizing pulse from the delay unit 28 is applied to an OR unit 32 and is translated to a pulse stretcher 33. The output of the latter is a pulse of relatively long duration suitable for resetting the cores of the counter. This resetting pulse is applied to the cores so as to ordinarily reset the cores A, B and C to store a binary ZERO and to reset the cores 1 through 8 to store a binary ONE but the counter being in synchronism has its cores already set in the states last mentioned so that the reset pulse has no effect at this time. During the reset interval the AND unit 26 is deconditioned by the On state of the flip-flop 29 thus terminating the supply of advance pulses from the inhibitor 27 to the counter 25.

The pulse translated by the AND unit 31 is also applied to turn Off a flip-flop 34 which had previously been turned On by the pulse translated by the AND unit 30 at the completion of the counter operation. Had the counter not been in synchronism with the system synchronizing pulse translated by the delay unit 28, the synchronizing pulse would not have been translated by the AND unit 31 so that the counter would not have been reset nor would the flip-flop 34 have been turned Off as earlier described. In this event, the On output circuit of the flip-flop 34 is applied to an integrator 35 which measures the On period of the flip-flop 34 and actuates an alarm 36 after the flip-flop 34 has remained On for a period sufficiently long to indicate lack of proper counter synchronization. When this condition occurs, a manual switch 37 is actuated to turn the flip-flop 34 Off and to condition an AND unit 38 to translate to the pulse stretcher 38 the next system synchronizing pulse translated by the delay unit 28. The pulse stretcher 33 thereupon resets the counter as earlier described and the counter should thereafter operate in proper synchronization with the system synchronizing pulses.

The pulse output of the AND unit 30 normally occurs in coincidence with the system synchronizing pulse translated by the delay unit 28 as earlier explained, and is applied through a pulse shaper 41 to a modulator or keyer unit 42 as a synchronizing pulse suitable for transmission to synchronize the operations of the position reporting system carried by each mobile craft. This synchronizing pulse applied to the unit 42 modulates a carrier wave generated by a carrier source 43 and also applied to the unit 42, and the modulated carrier wave is suitably amplified by an amplifier 44 and is radiated by an antenna system 45. This radiated synchronizing pulse occurs only at the initiation of each system operating cycle which, as previously mentioned, may be of the order of ten or eleven cycles duration. The units 42, 43 and 44 may accordingly comprise the usual voice communication equipment utilized by a ground controller to communicate with aircraft in his area. This synchronizing transmission thus need not require a separate transmission channel yet will not produce any serious impairment of usual voice communications.

*Mobile position reporting equipment*

Figure 4:
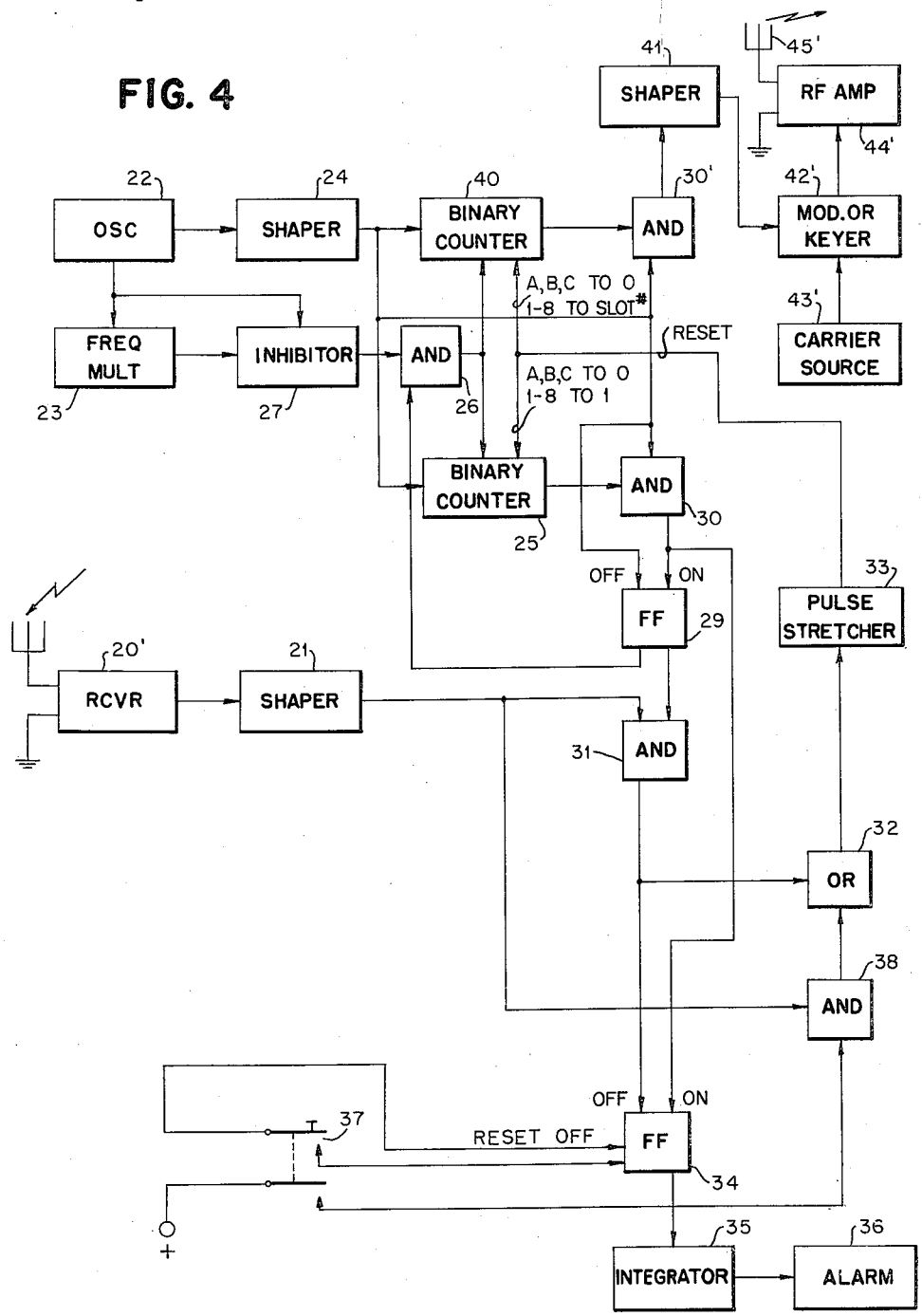
Fig. 4 represents the nature and arrangement of position-reporting equipment carried by each conveyance the position of which is automatically to be reported.

The equipment carried by a mobile craft, and by which it automatically transmits periodic position reports, is quite similar to the ground synchronizing equipment described in connection with Fig. 3. The reporting equipment is shown in Fig. 4 and components of Fig. 4 corresponding to the same components of Fig. 3 are identified by the same reference numerals while analogous components are identified by the same reference numeral primed.

The receiver 20' of the mobile equipment receives the synchronizing transmission radiated by the antenna 45 of the Fig. 3 synchronizing system, and the radiated synchronizing pulses are derived and applied to the shaper 21 to maintain synchronized operation of the binary counter 25 in the same manner as described in reference to the arangement of Fig. 3. There is the difference with the mobile equipment that it includes a second binary counter 40 which is driven by the output pulses of the shaper 24 and the pulses of the units 26 and 27 in the same manner as is the binary counter 25. There is the further difference that whereas the binary counter 25 is reset at the outset of each system cycle to its maximum counter capacity, as described in connection with Fig. 3, the binary counter 40 is reset at the outset of each system cycle to store a specific number corresponding to the number of the time slot assigned to the particular mobile equipment. Thus, if it be assumed by way of example that the mobile equipment is assigned the time slot 10,141, the binary counter 40 has its A, B and C cores reset to zero but its cores 1 through 8 reset to store the slot number last mentioned. As a result of this, the interval required for the binary counter 40 to count out, to be immediately reset to store maximum count, and then to count down from the maximum count to the number which it stores at reset corresponds to the same time interval required by the binary counter 25 to start with its maximum count capacity and count out. Thus, the binary counter 25 serves to insure synchronized system operation of the mobile equipment in the same manner that it does in the arrangement of Fig. 3, but there is the difference in the mobile equipment that the AND unit 30' is controlled by the count out of the binary counter 40 (occurring when the latter has counted down to its present binary number) so that the pulse applied to the modulator or keyer 42' now corresponds to a system cycle timing established by the binary number reset into the binary counter 40 and thereby corresponds to a particular assigned number of time slot. This pulse applied to the modulator unit 42' is the automatic position reporting pulse which each mobile equipment transmits once each system cycle, and is transmitted by the antenna 45' on the common system frequency used for position reporting.

*Area ground station equipment*

The position reporting pulse radiated by the mobile equipment as last described is received by each ground station in the area within which the mobile equipment is then operating. To this end, each ground station has a receiving system arranged as shown in detail in Fig. 5 for the ground station No. 1 and includes a receiver 50 for receiving the periodic position reports transmitted by the mobile craft in a particular area. The position reporting pulse, transmitted by modulation of the transmitted carrier wave, is derived by the receiver 50 and is applied to a wave shaper 51 which reshapes the pulse to sharpen its leading edge and applies the reshape pulse to the On input circuit of a pair of flip-flops 52 and 53. The receiving system also includes a counter 55, which may be considered an electronic clock and for convenience is often so referred to herein, which is driven through a delay unit 56 from a high frequency oscillator 57 providing an output of pulse waveform. In this, the counter or clock 55 is a binary counting device of conventional arrangement and operates to count the number of successive pulses of the oscillator 57. The counter 55 operates continuously through successive cycles of ZERO to full count, each cycle being of any convenient period such as 1000 microseconds. It will be appreciated from this that the counter or clock 55 always provides a suitable unit of reference time, for example, a one microsecond unit of time reference where the oscillator 57 has a frequency of one megacycle or far greater precision, one-tenth microsecond unit of time reference for an oscillator frequency of 10 megacycles.

Each digit of reference time output of the counter 55 is applied to an individual gate of a gate unit 59 in which all of the gates are normally closed but are caused to open by a pulse applied to a gate 60 from the oscillator 57 to open the gate 60 after the latter has been conditioned to open by the On output circuit of the flip-flop 52. It will be recalled that the flip-flop 52 was turned On by the received position reporting pulse of a mobile equipment, so that the opening of the gates of the unit 59 as last described causes the then existing count of the counter 55 to be transferred to and stored in a shift register 61. The output pulse of the gate 60 turns Off the flip-flop 52, thereby to close both the gates 60 and 59 so that only one time reference is translated from the counter 55 to the shift register 61. In this, it is the purpose of the delay unit 56 to delay any change of count by the counter 55 during the interval when the gates 59 may be open.

It will be apparent from the operation last described that the position reporting pulse received by the receiver 50 has its time of arrival recorded by transfer of the counter time count to storage in the shift register 61. For reasons which will later be explained, a sync pulse from a source 62 (which may simply provide a continuously available potential representative of a binary 1) is also translated through one of the gates of unit 59 at the time these gates open up and is stored in the first unit of the shift register 61 together with the time-of-arrival information effected by a received position reporting pulse.

At the time the flip-flop 52 was turned On by a received position pulse, the flip-flop 53 was also turned On as previously mentioned. The On output circuit of the latter opens a gate 64 which translates the next pulse from a pulse oscillator 65, having an oscillation frequency higher than the frequency of the system time slots (for example, a frequency of 11 kilocycles for one millisecond time slots), to turn On a flip-flop 66. The On output circuit of the latter opens a gate 67 which thereupon translates the pulses of the oscillator 65 as driving pulses to the shift register 61. The first such driving pulse turns the flip-flop 53 Off, and this pulse and succeeding pulses step the sync pulse and binary time number stored in the shift register endwise serially (that is, with the sync pulse and stored binary digits arranged in succession) out of the register and through a transmission circuit L1 to the remote computer input system 10, previously described in connection with Fig. 1 as being located at the regional control center. The driving pulses of the oscillator 65 are also supplied to the computer input system 10 through another transmission circuit L1'. The output pulses of the gate 67 are additionally applied to a counter 69 which provides a count equal to the number of digit storage positions in the shift register 61 so that the counter 69 counts out and shuts Off the flip-flop 66 at a time corresponding to the shift of the last digit of information from the shift register 61 into the transmission line L1. The flip-flop 66 thereupon closes down the gate 67 and terminates further operation of the shift register 61, and the receiving system thereafter stands in readiness to receive the next positional reporting pulse from a mobile equipment.

Figure 5:
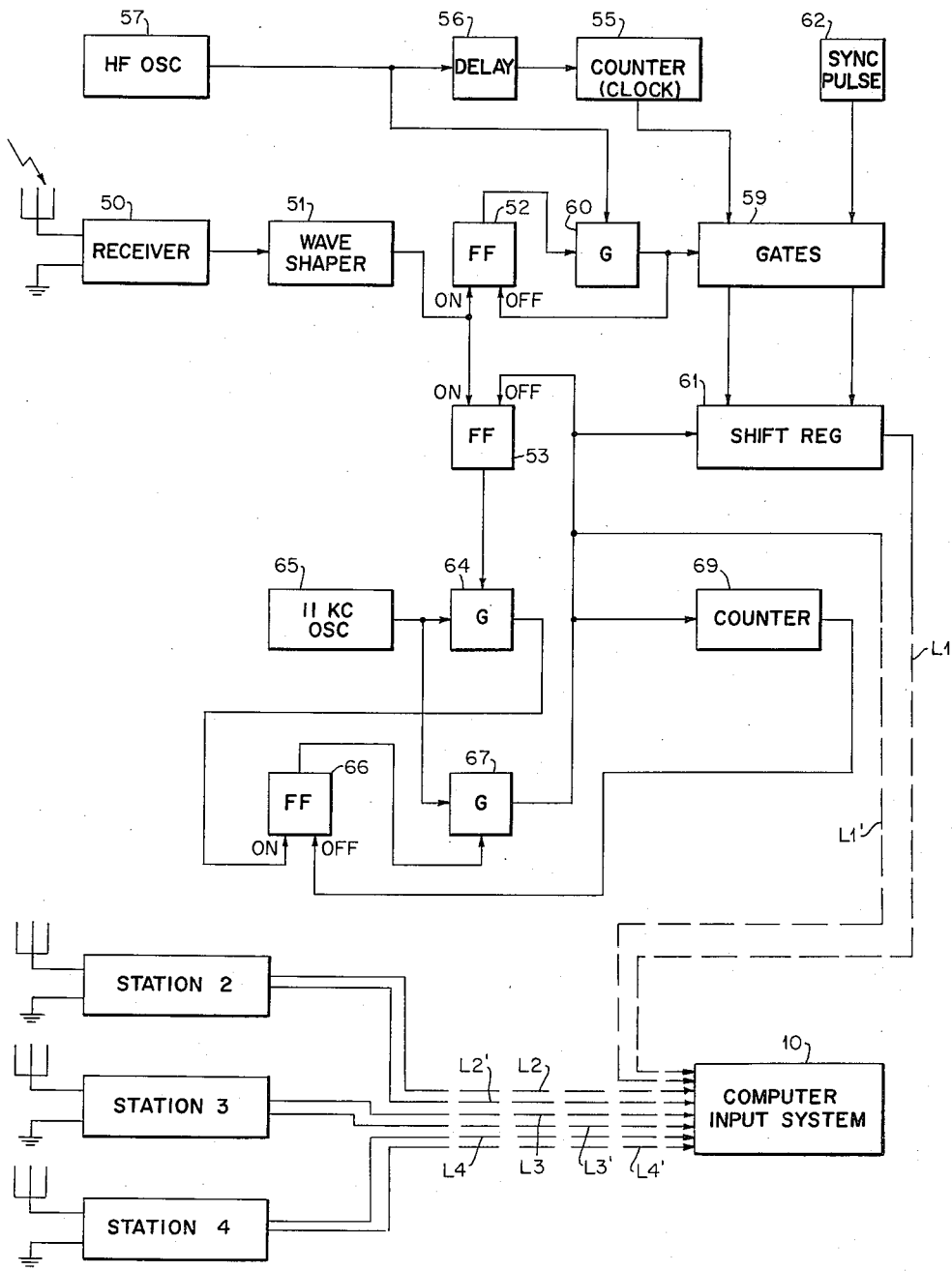
Fig. 5 represents the equipment arrangement utilized at each ground station in a position-reporting area.

As indicated in Fig. 5, the recorded time-of-arrival information of the position reporting pulse received at station No. 2 is also translated from the station 2 through a transmission line L2 (with driving pulses supplied through a line L2') to the computer input system 10, and this likewise occurs for time-of-arrival information at stations 3 and 4 which have representative individual transmission circuits L3, L3' and L4, L4' to the computer input system 10. Thus, the time-of-arrival information from all four stations of an area is automatically transmitted, as described, to the computer input system 10, from which it is supplied for utilization to the regional computer in a manner which will now be considered in detail.

Regional computer and display

The regional computer and display system is shown in Figs. 6–1, 6–2 and 6–3, these figures having the relationship shown in Fig. 6. The system employed in transferring time-of-arrival data, as received from ground stations in an area to temporary storage in the computer input system, is shown and will be described in detail for station 1 of the area, and it will be understood that like systems are used for transferring into temporary storage the information received from the other stations of an area, as indicated in Fig. 6–1.

Referring particular to Fig. 6—1, the time-of-arrival information transmitted over the transmission channel L1 is applied to each of two gates 75 and 76. The gate 76 is normally maintained closed by the Off state of a flip-flop 77 while the gate 75 is normally maintained open by the same state of the flip-flop 77. The time-of-arrival information transmitted from the ground station is preceded by a sync pulse (derived from the sync pulse source 62 as explained in connection with Fig. 5), and this sync pulse is translated through the open gate 75 to turn On a flip-flop 78. The On ouput circuit of the latter conditions gate 79 to translate a corresponding driving pulse arriving concurrently over line L1' from the ground station, and this translated pulse turns On the flip-flop 77 to close the gate 75 and open the gate 76, so that each digit of the time-of-arrival binary information transmitted through the transmission channel L1 is thereupon applied to a flip-flop 81 which is turned On by a binary ONE of received time-of-arrival information but is immediately turned Off again as will presently be explained.

The data transfer system shown in Fig. 6–1 operates under control of timing pulses having a much higher frequency than the frequency with which the digits of the time-of-arrival information arrive at the data transfer system. This timing system includes a primary timing pulse generator 83 which generates control pulses appearing in four output circuits of the generator and identified as timing pulses PTPI–PTP4. The timing pulses PTP1 are applied to a gate 84 of a secondary timing pulse generator, the gate 84 being opened through a cathode follower 88 by the On state of a flip-flop 85 and when so opened being effective to translate a PTP1 pulse to turn On a flip-flop 86. A PTP2 pulse is applied to a gate 87, also opened by the On state of the flip-flop 85, and the pulse translated by the gate 87 turns Off the flip-flop 86 to generate in an output circuit of this flip-flop a pulse STP1–2 of duration corresponding to the interval between the pulses PTP1 and PTP2. Due to the action of the flip-flop 85 presently to be described, this STP1–2 pulse is only generated on alternate ones of the PTP1 and PTU2 pulses as indicated in Fig. 6a where the primary timing pulses are graphically represented by curve A and the secondary generated pulses by curve B. The PTP4 pulses are applied to the flip-flop 85 operating in binary fashion so that one PTP4 pulse turns the flip-flop On and a succeeding PTP4 pulse turns the flip-flop 85 Off. While the flip-flop 85 is On, it opens a gate 89 which has applied to it the PTP4 pulses so that there is developed in the output circuit of this gate an STP4 pulse corresponding to the occurrence of alternate ones of the PTP4 pulses. The flip-flop 85 in its Off state opens a gate 91 through a cathode follower 92, the PTP4 pulses being also applied to the gate 91 to develop in its ouput circuit secondary timing pulses STP8 which measure two full cycles of operation of the pulse generator 83 as indicated in Fig. 6a.

Returning now to the operation of the data transfer system, when the flip-flop 77 is turned On by a received sync pulse as earlier explained, it opens a gate 94 which thereupon translates a concurrently arriving driving pulse from the line L1' to the On input circuit of a flip-flop 95.

The On state of the latter conditions a gate 96 to translate the next STP8 pulse from the secondary timing generator. It will be understood, as previously mentioned, that the pulses of the generator 83 are of much higher frequency (for example, having a frequency of 400 kilocycles) than are the driving pulses from the line L1', so that a driving pulse from the latter which turns the flip-flop 95 On may occur at any time relative to the STP8 pulse applied to the gate 96. The latter pulse when translated by the gate 96 turns a flip-flop 97 On, and this state of the flip-flop 97 through a cathode follower 98 performs three functions: (1) it conditions a gate 99 to translate the next PTP4 pulse applied from the generator 83, (2) it conditions an AND unit 101 which translates the received time-of-arrival information as will presently be explained, and (3) it conditions an AND unit 103. The next PTP4 pulse translated by the gate 99 resets the flip-flop 95 to its Off state. The operation thus far described has resulted in conditioning the gate 99 and the AND units 101 and 103 from STP8 time to PTP4 time (or 10 micro-seconds when the generator 83 has a frequency of 400 kilocycles as will be hereinafter assumed in the following description). Assuming by way of example that no sync pulse or time-of-arrival information binary pulse is received concurrently with the timing pulse which turns flip-flop 95 On, an STP1-2 pulse is applied to an OR unit 105 and is applied by the latter to the AND unit 103. Whenever the latter is conditioned by the On state of the flip-flop 94 in the manner earlier explained, the STP1-2 pulse of 2.5 microseconds duration, applied to the AND unit 103, is translated by the latter and is further translated by a power cathode follower 106 to a core shift driver 107. The latter thereupon delivers to the shift windings of a core type of shift register 108 (which ultimately stores the time-of-arrival information of station 1) a shift pulse which causes a one position shift operation of the register. This magnetic core shift type of register may be of the type shown and described in the copending application of Hawley K. Rising et al., Serial No. 502,634, filed April 20, 1955, entitled "Counter Circuit" and assigned to the same assignee as the present application. The foregoing described operation initiated by the operation of the flip-flop 95 shows the manner in which shift pulses are generated and applied to the registor 108 to step information serially into it.

Consider now the operation prevailing upon the occurrence of a sync pulse from the transmission circuit L1. The sync pulse turns the flip-flops 77 and 78 On, as previously explained, and a drive pulse from the line L1' is translated through the gate 94 to turn the flip-flop 95 On. The On state of the flip-flop 78 is translated through a cathode follower 109 and the OR unit 105 to the AND unit 103 which is conditioned as previously explained for ten microseconds by the operation of the flip-flop 95. Since the flip-flops 78 and 95 are turned Off together by a PTP4 pulse translated through the gate 99, the cathode follower 106 and core shift driver 107 are now energized for ten microseconds instead of 2.5 microseconds as previously described, and the shift windings of the core shift register 108 are similarly energized for ten microseconds. When the shift windings of the register 108 are energized for this length of time, any data information previously stored in the register 108 is destroyed and all cores thereof are set to the ZERO state since a binary ONE which is attempting to be transferred from one core to another of the register will be drowned out by the long duration shift current.

The flip-flops 78 and 95 are reset to their Off state by the next PTP4 pulse translated by the gate 99, but while the flip-flop 78 is in its On state it conditions a gate 110 to translate the next PTP4 pulse applied thereto from the generator 83. This translated PTP4 pulse is translated through an OR unit 111 to turn a flip-flop 112 On, and the latter is reset to its Off state by the next STP8 pulse applied to its Off input circuit from the timing generator. The flip-flop 112 thus remains in its On state for ten microseconds beginning at approximately the same time as the end of the shift current from the core shift driver 107. This operation of the flip-flop 112 results in "priming" (setting a binary ONE in the first stage) of the shift register 108 through a cathode follower 113.

Assume by way of example that the first digit of the time-of-arrival information transmitted through the transmission circuit L1 corresponds to a binary ZERO. This has the result that the flip-flop 95 turns On under control of the driving pulse from the line L1' and conditions the AND unit 103 for ten microseconds, and the flip-flop 78 being now in its Off state (being turned off after having been turned on by the sync pulse and the gate 75 having been closed by the flip-flop 77), the STP1-2 pulse translated by the OR unit 105 and the AND unit 103 and further translated by the cathode follower 106 and the core shift driver 107 produces a 2.5 microsecond pulse in the shift windings of the register 108 so that the ONE (corresponding to the synchronizing pulse) which was inserted in the first core of the register 108 as previously explained is now transferred to the second core of the register. The binary ONE upon being transferred from the first to the second core of the register is replaced by a ZERO in the first core since the flip-flop 78 is in its Off state as is also the data input flip-flop 81.

Assume now that the next digit of the time-of-arrival information transmitted through the transmission line L1 corresponds to a binary ONE. This binary ONE digit is applied through the gate 76 (opened by the On state of the flip-flop 77) to turn On the flip-flop 81. This occurs at the same time that a driving pulse from the line L1' turns On the flip-flop 95 which conditions the AND unit 103 to translate a STP1-2 pulse, as previously explained, to result in a one position shift of the register 108. The flip-flop 81 in its On state, together with the On states of flip-flops 95 and 97, conditions the AND unit 101 to provide a positive output pulse 10 microseconds in duration beginning shortly after STP8 time (delayed slightly due to rise time of the flip-flop 97 and delay of the cathode follower 98). The output pulse developed by the AND unit 101 is translated through a cathode follower 115 to condition a gate 116 to translate the next PTP4 pulse applied thereto from the generator 83. This pulse translated by the gate 116 is applied through the OR unit 111 to set the flip-flop 112 in its On state for 10 microseconds (the latter is turned Off again by a STP8 pulse as earlier mentioned). Therefore, after the shift pulse from the core shift driver 107 has completed the shift of the register 108, the flip-flop 112 through the cathode follower 113 causes the first core of the shift register 108 to be set in the one state thus storing a binary ONE corresponding to the binary ONE digit received through the transmission circuit L1 and applied to the flip-flop 81, as earlier described.

In this manner the serially presented binary digits of the time-of-arrival information are serially shifted into the register 108. The latter includes a sufficient number of core stages to store the maximum number of time-of-arrival information digits which will be received from any ground station. As the register is shifted to receive the last such information digit, the first story binary ONE corresponding to the initial sync pulse (hereinafter called a "sync-digit") is stepped out of the last core of the register and is applied through a delay unit 118 to turn the flip-flop 77 Off after a slight delay by the unit 118 sufficient to insure that the last time-of-arrival information digit has been translated through the gate 76 to set the flip-flop 81. The flip-flop 77 hereupon closes the data information gate 76, opens the sync information gate 75 in readiness for the next sync pulse received, and closes the gate 94 to terminate the translation of driving pulses from the line L1' to the flip-flop 95. All of the received time-of-arrival information from the ground station 2 is now stored in the register 108 in readiness to be transferred therefrom for computation, and the data transfer system stands ready to receive the next time-of-arrival information from the ground station.

The time-of-arrival information thus stored in the several station storage registers is now translated to the computer by the translating system shown in Figs. 6-2 and 6-3. This transfer is initiated by the last of the sync-digits to be stepped out of the station storage register, last to be filled with time-of-arrival information. Each sync-digit as it is stepped out of a register not only terminates operation of the associated data transfer system as earlier explained, but also turns On an individual one of a number of flip-flops 125-128 associated with individual ones of the storage registers. The On output of each flip-flop is applied to an AND unit 129, and the last of the flip-flops 125-128 to turn On causes a flip-flop 130 to be turned On. This flip-flop conditions an AND unit 131 to translate pulses from a pulse oscillator 132 to a four stage counter 133, but the AND unit 131 does not effect such translation until the output of the flip-flop 130 has been translated to the computer 11 to signify that information is stored in all of the station storage registers in readiness for computation (thereby to initiate the computer operation) and the computer has returned to the AND unit 131 a potential which opens the AND unit 131 and starts the counting operation of the counter 133. The operation of the transfer system is under control of the counter 133 as will become more apparent during the following description of the transfer operation.

The information stored in each of the station storage registers is applied in parallel to each of two gate units 136-143 as shown in the drawing. At time interval ONE of the counter 133, the information from the station 1 storage register is translated through the gate unit 136 to a subtractor unit 145 while the information in the station 2 storage register is likewise translated to the subtractor unit 145 through the gate unit 139. The subtractor unit receives the time-of-arrival information from stations 1 and 2 and derives and applies to a data register 146 the difference between the time-of-arrival of a position-reporting pulse received by stations 1 and 2. Concurrently with this operation, the flip-flop 125 associated with the station 1 register and the flip-flop 126 associated with the station 2 register being both On condition and AND unit 148 to apply from the AND unit 131 through a delay unit 149 a read-out pulse to a correction storage register 150. The information contained in the register 150 represents the indicated time difference prevailing between the counter or clocks of stations 1 and 2 at the calibration period in the current system cycle. The manner in which this information is derived and stored in the register 150 will be explained hereinafter, but it may be stated at this time that the information from this register is needed to correct the difference information stored in the register 146 to take into account any deviations from exact indicated-time synchronism of the counter or clocks of the ground stations 1 and 2, so that after correction the time-of-arrival difference for these stations when applied to the computer 11 will be the same as though the stations 1 and 2 counter or clocks were operating in exact synchronous relation. To this end, any correction information read out of the register 150 is translated through a gate 151 (which is opened at this time by a period-1 pulse applied thereto from the counter 133) to a correction register 152 where the information is immediately combined in an adder 153 with the time-of-arrival difference information applied to the adder 153 from the register 146. The corrected time-of-arrival difference information effected by the adder 153 is applied to a gate unit 154 which is opened by a period-1 pulse applied from the counter 133 through an OR unit 155 and a delay unit 156. The delay provided by the delay unit 156 is sufficient to enable the adder 153 to finalize the correction of time-of-arrival difference information. A gate unit 158 is opened concurrently with the gate unit 154 and supplies to the computer 11 information representing the X and Y coordinates of the particular reporting area with respect to the X and Y coordinates of the control region. This X and Y area coordinate information is made constantly available by an area coordinate unit 159 as applicable to the fixed location of the particular area within the control region, and the information thus supplied to the computer 11 enables the latter to derive regional coordinate computations by which to enable the display unit 12 to display on a regional coordinate basis the position in the region of the mobile craft which transmits its position reporting pulses to the area stations. This area coordinate information supplied by unit 159 is also stored in computer 11 awaiting completion of the transfer to the latter of the time-of-arrival difference information from the remaining stations of the reporting area.

Upon completion of the transfer to the computer 11 of the time-of-arrival difference information from stations 1 and 2, the second period established by the counter 133 effects similar transfer through gate units 138 and 141 to the computer 11 of the time-of-arrival difference information for stations 2 and 3, correction during transfer being effected by operation of the gates 166 and 167 and the register 168. In the third interval of the counter 133, the gates 140 and 142 and units 169-171 effect transfer to the computer 11 of the corrected time-of-arrival difference information for the stations 3 and 4, and in the time interval 4 of the counter 133 the gates 137 and 142 and units 172-174 effect transfer to the computer 11 of the corrected time-of-arrival difference information for stations 1 and 4. The computer 11 has thereupon received time-of-arrival information for all of the four ground stations of an area together with X and Y area coordinate information applicable to that area, and thereupon begins its computation to compute the reported position of the reporting craft in the particular area. In this, the computer operates according to the fixed program initially established for it by which to ascertain the X and Y area coordinates in conformity with a given method of computation, such as that according to Equations 16 and 17 above. Having computed the X and Y area coordinates position, the computer utilizes the X and Y area coordinate information supplied to it from the unit 159 to convert the ultimate coordinate computation to the origin of the control-region coordinates selected. The computed regional X and Y coordinate data are numbers in binary form and are then supplied to the position display 12 for display in a manner presently to be explained.

As each time-of-arrival difference information is supplied to the computer 11 in the manner above explained, the output of the delay unit 156 is applied to each of four AND units 161-164. The AND unit 161 has also applied thereto the first-period output of the counter 133 which it translates to the Off output circuit of the flip-flop 135 to turn the latter Off. Similarly, the AND unit 162 turns the flip-flop 126 Off during the second period of the counter 133, the AND unit 163 turns the flip-flop 127 Off during the third period of the counter 133, and the AND unit 164 turns the flip-flop 128 Off during the fourth period of the counter 133. When the counter 133 has completed its cycle and runs out, it turns Off the flip-flop 130 which thereupon closes down the AND unit 131 and terminates the translation of pulses from the oscillator 132 to the counter 133. This completes the transfer of area time-of-arrival information to the computer 11, and the transfer system is then ready to receive subsequent time-of-arrival information from the ground stations of the area.

The manner in which clock correction information is computed and stored in the correction registers 150, 168, 170 and 173 in each system cycle will now be considered.

It was earlier mentioned that an initial period in each system cycle is devoted to station clock calibration purposes. To this end, the programming of the computer 11 is changed in such manner that the computer receives from its memory storage the known X and Y coordinate values for an area calibrating transmitter, it receives from the area stations their time-of-arrival calibration information, and makes a reverse computation to ascertain to what extent if any the time-of-arrival calibration difference for a given pair of ground stations deviates from a known value corresponding to identity of indicated clock times at the two stations. The value of any such deviation is transferred from the computer to and stored in the appropriate one of the correction registers 150, 168, 170 or 173 corresponding to the pair of ground stations concerned. After completion of calibration computations for all ground stations in the region, the computer programming is changed for the remainder of the system cycle for computation of position reporting information emanating from mobile craft in the region. Computer program control in this manner is effected by use at the computer of a Figure 4 synchronizing system by which to initiate calibration computations coincident with the occurrence of each system cycle synchronizing pulse and to terminate such computations at the time of occurrence of a counter output pulse identifying a preselected time-slot in the system cycle.

*Position display equipment*

The X and Y regional position computation results supplied in binary form to the position display unit 12 are converted by the latter to two corresponding X and Y voltages suitable for application to the deflecting electrodes of a cathode ray form of display device. The binary conversion system may be of the type shown and described in copending application Serial No. 595,993, filed July 5, 1956, entitled "Digital-to-Analogue Decoder Circuits" in the name of Henry R. Zieman et al., and assigned to the same assignee as the present application.

The voltage outputs of the decoder system last mentioned are applied to quadrature positioned deflecting electrodes of a cathode ray tube display device which preferably is of the type shown in the United States Patent No. 2,728,872, granted January 27, 1955, to Henry M. Smith. This display tube is one capable of providing a continuing display image of each indicated position of a mobile craft, the display intensity remaining uniform for as long a period as desired. In this manner, successive transient positions of any mobile craft may be displayed and its direction of movement, transient position at any time, and velocity of movement readily ascertained by inspection or measurement and computation. In practice, the display individual to each of all of the mobile craft within a control region will be allowed to remain on display until the display after a period of time becomes unduly confusing or the need for the display ceases, at which time the display may be removed and a new display started. In this display, the positions of all mobile craft in a region are displayed without significant time lag and with a high degree of accuracy as is the past history of their movement over a period of time. Thus, the future course of movement and the time-of-arrival of one or more mobile craft at any given point may be readily deduced from the display, thereby attaining highly efficient traffic control and enabling the control system to handle a maximum volume of traffic with entire safety and dispatch.

While a specific form of invention has been described for purposes of illustration, it is contemplated that possible changes may be made without departing from the spirit of the invention.

What is claimed is:

1. An automatic position-reporting system for mobile craft comprising, means carried by each reporting craft and including timing means establishing a system operating cycle which is uniform for all craft and synchronized on a systemwide basis and transmission means controlled thereby for automatically initiating and transmitting during each of successive system operating cycles and at a preselected time therewithin individual to each reporting craft a position-reporting pulse adapted to identify the reporting craft by time of transmission and the transient position thereof by the relative propagation intervals to remote points, means including a plurality of fixedly positioned stations spaced relative to each other for receiving each said transmitted pulse and for identifying the time of arrival thereof individually at each said station, and computing means for receiving and utilizing the independent times-of-arrival information from at least two pairs of said stations to compute each said transient position of said each craft relative to the positions of said stations.

2. An automatic position-reporting system for mobile craft comprising, cyclically operating means carried by each reporting craft and including timing means establishing a system operating cycle which is uniform for all craft and synchronized on a systemwide basis and transmission means controlled thereby for automatically initiating and transmitting at a preselected time in each of successive system operating cycles a position-reporting pulse adapted to identify the reporting craft by time of transmission and the transient position thereof by the relative propagation intervals to remote points, said preselected transmission time being individual to each said craft and differing from the preselected transmission time of any other craft, means including a plurality of fixedly positioned stations spaced relative to each other for receiving each said transmitted pulse and for identifying the time of arrival thereof at each said station, and computing means for receiving and utilizing the independent times-of-arrival information from at least two pairs of said stations to compute each said transient position of said each craft relative to the positions of said stations.

3. An automatic position-reporting system for mobile craft comprising, cyclically operating position-reporting means carried by each reporting craft and including timing means establishing a system operating cycle uniform for all craft and transmission means controlled thereby for automatically initiating and transmitting during each of successive system operating cycles and at a preselected time therewithin individual to each reporting craft a position reporting pulse adapted to identify the reporting craft by time of transmission and the transient position thereof by the relative propagation intervals to remote points, means for synchronizing the operating cycles of said position-reporting means of each such craft with relation to that of all other craft, means including a plurality of fixedly positioned stations spaced relative to each other for receiving each said transmitted pulse and for identifying the time of arrival thereof individually at each said station, and computing means for receiving and utilizing the independent times-of-arrival information from a least two pairs of said stations to compute each said transient position of said each craft relative to the positions of said stations.

4. An automatic position-reporting system for mobile craft comprising, cyclically operating position-reporting means carried by each reporting craft and including timing means establishing a system operating cycle uniform for all craft and transmission means controlled thereby for automatically initiating and transmitting at a preselected time in each of successive system operating cycles a position reporting pulse adapted to identify the reporting craft by time of transmission and the transient position thereof by the relative propagation intervals to remote points, said preselected transmission time being individual to each said craft and differing from the preselected transmission time of any other craft, means for synchronizing the operating cycles of said position-reporting means of each such craft with relation to that of all other craft to effect position reporting by said craft successively in the order of said preselected transmission times, means including a plurality of fixedly positioned stations spaced relative to each other for receiving each said transmitted pulse and for identifying the time of arrival thereof individually at each said station, and computing means for receiving and utilizing the independent times-of-arrival information from at least two pairs of said stations to compute each said transient position of said each craft relative to the positions of said stations.

5. An automatic position-reporting system for mobile craft comprising, means carried by each reporting craft and including timing means establishing a system operating cycle which is uniform for all craft and synchronized on a systemwide basis and transmission means controlled thereby for automatically initiating and transmitting during each of successive system operating cycles and at a preselected time therewithin individual to each reporting craft a position-reporting electromagnetic pulse adapted to identify the reporting craft by time of transmission and the transient position thereof by the relative propagation intervals to remote points, the electromagnetic transmissions of all said craft occurring on a common transmission frequency, means including a plurality of fixedly positioned stations spaced relative to each other for receiving each said transmitted pulse and for identifying the time of arrival thereof individually at each said station, and computing means for receiving and utilizing the independent times-of-arrival information from at least two pairs of said stations to compute each said transient position of said each craft relative to the positions of said stations.

6. An automatic position-reporting system for mobile craft comprising, means carried by each reporting craft and including timing means establishing a system operating cycle which is uniform for all craft and synchronized on a systemwide basis and transmission means controlled thereby for automatically initiating and transmitting at a preselected time individual to said craft and fixedly differing from the preselected transmission time of any other craft and during each of successive system operating cycles a position-reporting electromagnetic pulse adapted to identify the reporting craft by time of transmission and the transient position thereof by the relative propagation intervals to remote points, the electromagnetic transmissions of all said craft occurring on a common transmission frequency, means including a plurality of fixedly positioned stations spaced relative to each other for receiving each said transmitted pulse and for identifying the time of arrival thereof individually at each said station, and computing means for receiving and utilizing the independent times-of-arrival information from at least two pairs of said stations to compute each said transient position of said each craft relative to the positions of said stations.

7. An automatic position-reporting system for mobile craft comprising, means carried by each reporting craft and including timing means establishing a system operating cycle which is uniform for all craft and synchronized on a systemwide basis and transmission means controlled thereby for automatically initiating and transmitting during each of successive system operating cycles and at a preselected time therewithin individual to each reporting craft a position-reporting pulse adapted to identify the reporting craft by time of transmission and the transient position thereof by the relative propagation intervals to remote points, means including a plurality of fixedly positioned stations spaced relative to each other for receiving each said transmitted pulse and for recording the time of arrival thereof individually at each said station, and computing means for receiving and utilizing the difference between the time-of-arrival recording at the stations of at least two pairs of said stations to compute each said transient position of said each craft relative to the positions of said pairs of stations.

8. An automatic position-reporting system for mobile craft comprising, means carried by each reporting craft and including timing means establishing a system operating cycle which is uniform for all craft and synchronized on a system-wide basis and transmission means controlled thereby for automatically initiating and transmitting during each of successive system operating cycles and at a preselected time therewithin individual to each reporting craft a position-reporting pulse adapted to identify the reporting craft by time of transmission and the transient position thereof by the relative propagation intervals to remote points, means including a plurality of fixedly positioned stations spaced relative to each other for receiving each said transmitted pulse and for recording the time of arrival thereof at each said station, means at each said station for transmitting to a location common to said stations the recorded time-of-arrival information of said each station, and computing means at said common location for receiving and utilizing the transmitted times-of-arrival information from at least two pairs of said stations to compute each said transient position of said each craft relative to the positions of said stations.

9. An automatic position-reporting system for mobile craft comprising, means carried by each reporting craft and including timing means establishing a system operating cycle which is uniform for all craft and synchronized on a system-wide basis and transmission means controlled thereby for automatically initiating and transmitting during each of successive system operating cycles and at a preselected time therewithin individual to each reporting craft a position-reporting pulse adapted to identify the reporting craft by time of transmission and the transient position thereof by the relative propagation intervals to remote points, means including a plurality of fixedly positioned stations spaced relative to each other for receiving each said transmitted pulse and for recording the time of arrival thereof at each said station, means at each said station for transmitting to a location common to said stations the recorded time-of-arrival information of said each station, means for periodically determining the relative difference of indicated times between the stations of at least two pairs thereof, and computing means at said common location for receiving and correcting for said indicated time differences the transmitted times-of-arrival information from said pairs of stations and for utilizing the corrected time-of-arrival information to compute each said transient position of said each craft relative to the positions of said stations.

10. An automatic position-reporting system for mobile craft comprising, means carried by each reporting craft and including timing means establishing a system operating cycle which is uniform for all craft and synchronized on a system-wide basis and transmission means controlled thereby for automatically initiating and transmitting during each of successive system operating cycles and at a preselected time therewithin individual to each reporting craft a position-reporting pulse adapted to identify the reporting craft by time of transmission and the transient position thereof by the relative propagation intervals to remote points, means including a plurality of fixedly positioned stations spaced relative to each other for receiving each said transmitted pulse and for recording the time of arrival thereof at each said station, means at each said station for transmitting to a location common to said stations the recorded time-of-arrival information of said each station, a source of calibration reference time, means responsive to the reference time of said source for periodically determining the relative difference of indicated times between the stations of at least two pairs thereof, and computing means at said common location for receiving and correcting for said indicated-time differences the transmitted times-of-arrival information from said pairs of stations and for utilizing the corrected time-of-arrival information to compute each said transient position of said each craft relative to the positions of said stations.

11. An automatic position-reporting system for mobile craft comprising, means carried by each reporting craft and including timing means establishing a system operating cycle which is uniform for all craft and synchronized on a systemwide basis and transmission means controlled thereby for automatically initiating and transmitting during each of successive system operating cycles and at a preselected time therewithin individual to each reporting craft a position-reporting pulse adapted to identify the reporting craft by time of transmission and the transient position thereof by the relative propagation intervals to remote points, means including a plurality of fixedly positioned stations spaced relative to each other for receiving each said transmitted pulse and for recording the time of arrival thereof at each said station, means at each said station for transmitting to a location common to said stations the recorded time-of-arrival information of said each station, means having preestablished known spacings from each of said stations for transmitting thereto a calibration reference-time electromagnetic pulse, means responsive to the recorded times of arrival of said calibration pulse at said stations for periodically determining the relative difference of indicated times between the stations of at least two pairs thereof, and computing means at said common location for receiving and correcting for said indicated-time differences the transmitted times-of-arrival information from said pairs of stations and for utilizing the corrected time-of-arrival information to compute each said transient position of said each craft relative to the positions of said stations.

12. An automatic position-reporting system for mobile craft comprising, means carried by each reporting craft and including timing means establishing a system operating cycle which is uniform for all craft and synchronized on a systemwide basis and transmission means controlled thereby for automatically initiating and transmitting during each of successive system operating cycles and at a preselected time therewithin individual to each reporting craft a position-reporting pulse adapted to identify the reporting craft by time of transmission and the transient position thereof by the relative propagation intervals to remote points, means including a plurality of fixedly positioned terrestrial stations spaced relative to each other for receiving each said transmitted pulse and for recording the time of arrival thereof at each said station, means at each said station for transmitting to a location common to said stations the recorded time-of-arrival information of said each station, a fixedly positioned terrestrial transmitting station having precisely known spacings from said stations for transmitting thereto a calibration reference-time electromagnetic pulse, means responsive to the recorded times of arrival of said calibration pulse at said stations for periodically determining the relative difference of indicated times between the stations of at least two pairs thereof, and computing means at said common location for receiving and correcting for said indicated-time differences the transmitted times-of-arrival information from said pairs of stations and for utilizing the corrected time-of-arrival information to compute each said transient position of said each craft relative to the positions of said stations.

13. An automatic position-reporting system for mobile craft comprising, means carried by each reporting craft and including timing means establishing a system operating cycle which is uniform for all craft and synchronized on a system-wide basis and transmission means controlled thereby for automatically initiating and transmitting during a terminal portion of each of successive reporting-system operating cycles and at a preselected time therewithin individual to each reporting craft a position-reporting pulse adapted to identify the reporting craft by time of transmission and the transient position thereof by the relative propagation intervals to remote points, means including a plurality of fixedly positioned stations spaced relative to each other for receiving each said transmitted pulse and for recording the time of arrival thereof at each said station, means at each said station for transmitting to a location common to said stations the recorded time-of-arrival information of said each station, means operative during an initial portion of each of successive ones of said reporting-system cycles for periodically determining the relative difference of indicated times between the stations of at least two pairs thereof, and computing means at said common location for receiving and correcting for said indicated-time differences the transmitted times-of-arrival information from said pairs of stations and for utilizing the corrected time-of-arrival information to compute each said transient position of said each craft relative to the positions of said stations.

14. An automatic position-reporting system for mobile craft comprising, means carried by each reporting craft and including timing means establishing a system operating cycle which is uniform for all craft and synchronized on a system-wide basis and transmission means controlled thereby for automatically initiating and transmitting during a terminal portion of each of successive reporting-system operating cycles and at a preselected time therewithin individual to each reporting craft a position-reporting pulse adapted to identify the reporting craft by time of transmission and the transient position thereof by the relative propagation intervals to remote points, means including a plurality of fixedly positioned stations spaced relative to each other for receiving each said transmitted pulse and for recording the time of arrival thereof at each said station, means at each said station for transmitting to a location common to said stations the recorded time-of-arrival information of said each station, means having preestablished known spacings from each of said stations for transmitting thereto during an initial portion of each reporting-system cycle a calibration reference-time electromagnetic pulse, means responsive to the recorded times of arrival of said calibration pulse at said stations for determining during said initial portion of said each system cycle the relative difference of indicated times between the stations of at least two pairs thereof, and computing means at said common location for receiving and correcting in each said system cycle for said indicated-time differences the transmitted times-of-arrival information from said pairs of stations and for utilizing the corrected time-of-arrival information to compute each said transient position of said each craft relative to the positions of said stations.

15. An automatic position-reporting system for mobile craft comprising, means carried by each reporting craft and including timing means establishing a system operating cycle which is uniform for all craft and synchronized on a system-wide basis and transmission means controlled thereby for automatically initiating and transmitting during each of successive system operating cycles and at a preselected time therewithin individual to each reporting craft a position-reporting pulse adapted to identify the reporting craft by time of transmission and the transient position thereof by the relative propagation intervals to remote points, means including a plurality of fixedly positioned stations spaced relative to each other for receiving each said transmitted pulse and for recording as a binary number the relative time when said each pulse arrives at each said station, means at each said station for transmitting in serial form through a transmission channel to a location common to said stations each binary number recorded at said each station, and digital computing means at said common location for receiving and utilizing the binary numbers from at least two pairs of said stations to compute each said transient position of said each craft relative to the positions of said stations.

16. An automatic position-reporting system for mobile craft within any of a plurality of reporting areas constituting a reporting region comprising, regional means for establishing successive system operating cycles, position-reporting means carried by each reporting craft for automatically initiating and transmitting in each of successive system cycles and at a preselected time therein individual to each said craft a position-reporting pulse adapted to identify the reporting craft by time of transmission and the transient position thereof by the relative propagation intervals to remote points, means controlled by said regional means for controlling and synchronizing on a regional basis the operation of said position-reporting means of each craft to effect position reporting on a regional basis by all said craft successively in the order of said preselected transmission times, means including a plurality of fixedly positioned stations included in each said area and spaced relative to each other for receiving the transmitted pulse of each craft within said each area and for identifying the time of arrival thereof individually at each said station, and computing means for receiving and utilizing the independent times-of-arrival information from at least two pairs of said stations of said each area to compute each transient position of each craft within said each area relative to the positions of said stations therein.

17. An automatic position-reporting system for mobile craft comprising, means including system cycle timing means carried by each mobile craft and synchronized on a system-wide basis for transmitting under control of said timing means position-reporting electromagnetic pulse energy having a time-of-transmission characteristic identifying individual ones of reporting craft, means including a plurality of fixedly positioned stations for receiving each said transmitted electromagnetic energy pulse and for identifying the time of arrival thereof individually at each said station, and means for receiving and utilizing the independent times-of-arrival information from at least two pairs of said stations to identify each said reporting craft and to ascertain the transient position thereof relative to that of said pairs of said stations.

18. An automatic position-reporting system for mobile craft comprising, means carried by each mobile craft and synchronized on a system-wide basis for transmitting once within each system operating cycle position-reporting electromagnetic pulse energy having a preselected individual system-related time of transmission identifying individual ones of reporting craft, means including a plurality of fixedly positioned stations for receiving each said transmitted electromagnetic energy pulse and for identifying the time of arrival thereof individually at each said station, and means for receiving and utilizing the independent times-of-arrival information from at least two pairs of said stations to identify each said reporting craft and to ascertain the transient position thereof relative to that of said pairs of said stations.

19. An automatic position-reporting system for mobile craft comprising, means carried by each mobile craft for transmitting once within each system operating cycle position-reporting electromagnetic pulse energy having a system-related time of transmission identifying individual ones of reporting craft, means including a plurality of fixedly positioned stations for receiving each said transmitted electromagnetic energy pulse and for identifying the time of arrival thereof individually at each said station, one of said means including means for establishing and initiating each cycle of system operation and said craft-borne means including means responsive to initiation of each system cycle of operation for establishing for each such craft-borne means a time of transmission individual thereto and differing from that of any other craft-borne means in the system, and means for receiving and utilizing the independent times-of-arrival information from at least two pairs of said stations to identify each said reporting craft and to ascertain the transient position thereof relative to that of said pairs of said stations.

20. An automatic position-reporting system for mobile craft comprising, means carried by each mobile craft for transmitting once within each system operating cycle position-reporting electromagnetic pulse energy having a system-related time of transmission identifying individual ones of reporting craft, means including a plurality of fixedly positioned stations for receiving each said transmitted electromagnetic energy pulse and for identifying the time of arrival thereof individually at each said station, one of said means including means for establishing and initiating each cycle of system operation and said craft-borne means including timing means having a cycle of operation initiated in fixed time relation to the initiation of each system cycle for establishing for each such craft-borne means a time of transmission individual thereto and differing from that of any other craft-borne means in the system, and means for receiving and utilizing the independent times-of-arrival information from at least two pairs of said stations to identify each said reporting craft and to ascertain the transient position thereof relative to that of said pairs of said stations.

21. An automatic position-reporting system for mobile craft comprising, means carried by each mobile craft for transmitting once within each system operating cycle position-reporting electromagnetic pulse energy having a system-related time of transmission identifying individual ones of reporting craft, means including a plurality of fixedly positioned stations for receiving each said transmitted electromagnetic energy pulse and for identifying the time of arrival thereof individually at each said station, one of said means including means for establishing and initiating each cycle of system operation and said craft-borne means including a source of pulses providing successive uniform time increments and counting means for counting said pulses to establish and initiate each cycle of operation of said craft-borne means, said craft-borne means also including means responsive to initiation of each cycle of system operation for initiating a corresponding cycle of operation of said counting means and means controlled by said counting means for establishing for each such craft-borne means a time of transmission individual thereto and differing from that of any other craft-borne means in the system, and means for receiving and utilizing the independent times-of-arrival information from at least two pairs of said stations to identify each said reporting craft and to ascertain the transient position thereof relative to that of said pairs of said stations.

22. An automatic position-reporting system for mobile craft comprising, means carried by each mobile craft and having a cyclic operation synchronized on a system-wide basis for transmitting position-reporting electromagnetic pulse energy having a time-of-transmission characteristic identifying individual ones of reporting craft, means including a plurality of fixedly positioned stations for receiving each said transmitted electromagnetic energy pulse and each said station including a time clock responsive to said each received electromagnetic energy pulse for recording the time of arrival thereof individually at each said station, and means for receiving and utilizing the independent times-of-arrival information from at least two pairs of said stations to identify each said reporting craft and to ascertain the transient position thereof relative to that of said pairs of said stations.

23. An automatic position-reporting system for mobile craft comprising, means carried by each mobile craft and having a cyclic operation synchronized on a system-wide basis for transmitting position-reporting electromagnetic pulse energy having a time-of-transmission characteristic identifying individual ones of reporting craft, means including a plurality of fixedly positioned stations for receiving each said transmitted electromagnetic energy pulse and each station including time indicating means responsive to each said received pulse for making a time record of the time of arrival of each said pulse individually at each said station, and means for receiving and utilizing the independent times-of-arrival record information from at least two pairs of said stations to identify each said reporting craft and to ascertain the transient position thereof relative to that of said pairs of said stations.

24. An automatic position-reporting system for mobile craft comprising, mobile means carried by each mobile craft and including a source of pulses providing successive time increments and counting means for counting said pulses to establish and initiate each cycle of operation of said mobile means, said mobile means also including means controlled by said counting means for transmitting position-reporting electromagnetic pulse energy having a time-of-transmission characteristic identifying individual ones of reporting craft, fixed means including a plurality of fixedly positioned stations for receiving each said transmitted electromagnetic energy pulse and including at each said station a source of pulses providing successive time increments and counting means for counting said pulses to establish a reference time identifying the time of arrival of each said pulse individually at each said station, one of said fixed and mobile means including means for establishing and initiating each cycle of system operation by initiating each cycle of operation of each of said counting means, and means for receiving and utilizing the independent times-of-arrival information from at least two pairs of said stations to identify each said reporting craft and to ascertain the transient position thereof relative to that of said pairs of stations.

25. An automatic position-reporting system for mobile craft comprising, timing means carried by each reporting craft and providing during an operating period thereof successive uniform time increments, means controlled by said timing means for translating electromagnetic pulse energy at a preselected time increment within each operating period thereof and identifying by said preselected time increment an individual reporting craft, and means for maintaining the initiation of each said operational period of said timing means in synchronism with a system time reference standard.

26. An automatic position-reporting system for mobile craft comprising, timing means carried by each reporting craft and including a source of relatively stable periodicity timing pulses providing successive uniform time increments and counting means for counting said timing pulses to provide at least one repetitive operating period for said timing means, means controlled by said counting means for translating electromagnetic pulse energy at a preselected time increment within each operating period of said timing means and identifying by said preselected time increment an individual reporting craft, and means responsive to an electrical signal furnished by a reference time standard for controlling said counting means to maintain the initiation of each said operational period of said timing means in synchronism with said system time reference standard.

27. An automatic position-reporting system for mobile craft comprising, timing means carried by each reporting craft and including a relatively stable oscillatory system providing timing pulses defining successive uniform time increments and a closed-ring magnetic core counter for receiving and counting said pulses to provide at least one repetitive operating period for said timing means, means controlled by said counter for translating electromagnetic pulse energy at a preselected time increment within each operating period of said timing means and identifying by said preselected time increment an individual reporting craft, and means responsive to an electrical signal furnished by a system time reference standard for controlling the reset state of said counter to maintain the initiation of each said operational period of said timing means in synchronism with said time reference standard.

28. An automatic position-reporting system for mobile craft comprising, timing means carried by each reporting craft and including a stable pulse oscillator providing timing pulses defining successive uniform time increments and a closed-ring magnetic core binary counter for receiving and counting said pulses to provide at least one repetitive operating period for said each timing means, means controlled by the completion of a preselected count by said counter for translating electromagnetic pulse energy at a preselected timing increment within each operating period of said timing means and identifying by said preselected time increment an individual reporting craft, and means responsive to an electrical signal furnished by a reference time standard for controlling the reset state of said counter to maintain the initiation of each said operational period of said timing means in synchronism with said reference time standard.

29. An automatic position-reporting system for mobile craft comprising, timing means carried by each reporting craft and including a source of relatively stable periodicity timing pulses defining successive uniform time increments and counting means for receiving and counting said pulses to provide at least one repetitive operating period for said timing means, means controlled by said counting means for translating electromagnetic pulse energy at a preselected time increment within each operating period of said timing means and identifying by said preselected time increment an individual reporting craft, manually actuable means responsive to manual actuation and to an electrical signal furnished by a system time reference standard for controlling said counting means to initiate each new operational period of said timing means in synchronism with said reference time standard, means operative upon manual initiation of each said new operational period and responsive to said electrical signal for thereafter automatically controlling said counting means to maintain each operational period of said timing means in synchronism with said reference time standard, and means responsive to failure of said timing means to maintain synchronism with said time reference standard for providing a sensible alarm.

References Cited in the file of this patent

UNITED STATES PATENTS

| | | |
|---|---|---|
| 2,470,787 | Nosker | May 24, 1949 |
| 2,523,244 | Woodward | Sept. 19, 1950 |
| 2,717,735 | Luck | Sept. 13, 1955 |

OTHER REFERENCES

IRE Transactions-Electronic Computers June 1954, "Digital Techniques in Analog Systems," by M. A. Meyer, pp. 23-29.